Dec. 2, 1969

T. R. FREDRIKSEN 3,482,155

TIME OPTIMAL SERVO CONTROL SYSTEM

Filed Dec. 30, 1966

INVENTOR
THORBJOERN R. FREDRIKSEN

BY John L Jackson

ATTORNEY

Dec. 2, 1969  T. R. FREDRIKSEN  3,482,155
TIME OPTIMAL SERVO CONTROL SYSTEM
Filed Dec. 30, 1966  4 Sheets-Sheet 3

United States Patent Office 3,482,155
Patented Dec. 2, 1969

3,482,155
TIME OPTIMAL SERVO CONTROL SYSTEM
Thorbjoern R. Fredriksen, Los Gatos, Calif., assignor to International Business Machines Corporation, Armonk, N.Y., a corporation of New York
Filed Dec. 30, 1966, Ser. No. 606,362
Int. Cl. H02p 5/46; G05b 11/00
U.S. Cl. 318—18                9 Claims

ABSTRACT OF THE DISCLOSURE

A positional servo system controls a motor driving a load to a target position. Signals proportional to the velocity of the motor and to the distance of the load from the target are generated and applied to the motor control logic. Said logic is operable, when the motor is driving at less than its top speed when the load approaches the target position, to cause the motor to alternate between acceleration and deceleration to cause the load to intersect the time optimal deceleration trajectory along the highest possible one of a number of corrective velocity levels.

---

This invention relates to positional servo mechanisms in general and more particularly to a servo system which approximates time optimal performance by causing the driven load during deceleration to closely follow a time optimal deceleration trajectory by correcting at a number of predetermined velocity and position points for any deviation from the time optimal trajectory and further causes the driven load to approach the time optimal deceleration trajectory along the highest possible one of a number of velocity levels.

Two types of loads may be driven by a servo mechanism—one, the size of which is always the same, or one the size of which varies from move to move. Several ways of positioning uniform loads have been employed. In the so-called bang-bang mode, full forward power is applied for one-half the distance to the new position and full reverse power is applied from mid-point to zero velocity. Theoretically, ignoring friction losses and assuming that the system is not velocity saturated, the load will, therefore, arrive at the new position in a time optimal manner. Friction is, of course, present and, therefore, usually some sort of terminal correction must be made. The terminal correction is by necessity at a low velocity and is, therefore, relatively time consuming.

Obviously, however, the above approach is unsatisfactory in those cases where the load varies, friction varies, or where the system is velocity saturated. Where any of these three is present, some point must be chosen at which time the deceleration mode can be entered into and the system brought to zero velocity at or near the desired position. This point is usually a "worst case" point. By worst case is meant that point at which deceleration can be applied and the system brought to zero velocity at the new position with the largest possible load. This approach, however, has several shortcomings. For example, with lesser loads, the system will undershoot and terminal correction will be required. As above indicated, this terminal correction is made at a near zero time consuming velocity. This undershoot and requisite terminal correction problem is also caused by frictional increases. Additionally, perhaps the greatest detriment to time optimal performance is presented when the initial position and new position are separated by an amounted such that the system cannot achieve it usual operating speed. Assume, for example, that the servo motor is a bifilor synchronous induction motor (stepping motor) and deceleration is always applied when the load arrives at a position forty steps from the new position. Assume further that the old position is forty-one steps from the new position. In this case, the motor would accelerate for only one step before full deceleration is applied. Obviously, then, the load would arrive at zero velocity thirty-nine steps from the new position. Hence, a relatively slow and tedious terminal correction would be required.

It is, therefore, an object of the present invention to provide a novel time optimal control system employing a fixed deceleration point which is capable of moving uniform or varying loads without undershoot.

Another object of the present invention is to provide a new servo system wherein the following of a time optimal deceleration trajectory is accomplished by applying corrections to the system at a number of velocities and position points on the time optimal deceleration trajectory.

Another object of the invention is to provide a new servo system wherein a fixed deceleration point is employed which system will track along one of a number of predetermined velocity traces to intercept the time optimal deceleration trajectory in the event that system operating speed has not been achieved at the time that the load arrives at the deceleration point.

The foregoing and other objects, features and advantages of the invention will be apparent from the following more particular description of a preferred embodiment of the invention, as illustrated in the accompanying drawings, in which:

Briefly, there is provided a system for generating control signals for application to a motor driving a load to a target position including means for generating signals proportional to the velocity of the motor and means for generating signals proportional to the distance of the load from the target position. A logic means is receptive of the veolcity signals and error signals. The logic means is operable, when the motor is driving at less than it top speed when the load approaches a predetermined distance from the target position, to cause the motor to alternate between acceleration and deceleration modes of operation to thereby cause the load to intersect the time optimal deceleration trajectory on a predetermined corrective speed level. The predetermined speed level followed is dependent on the distance to the target and the speed of the motor.

Figure 1:
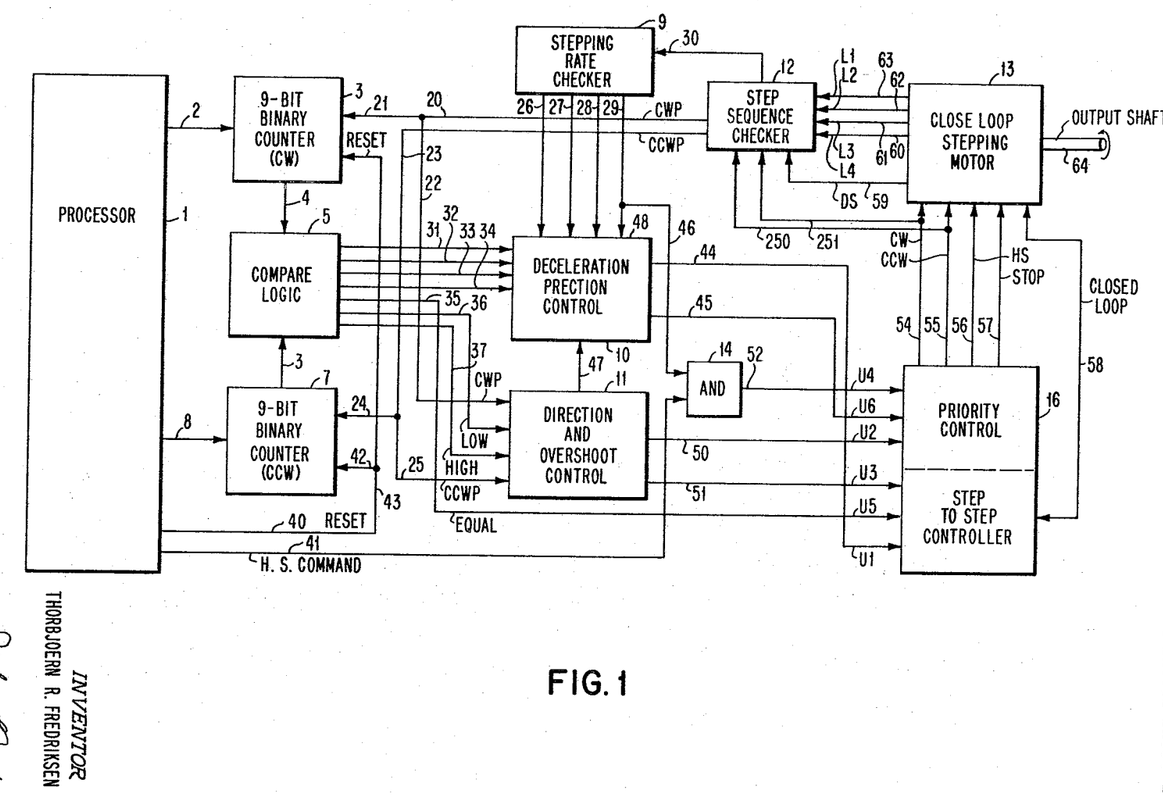
FIG. 1 is an overall block diagram of the hereinafter described novel time optimal servo control system.

In FIG. 1 is shown an overall block diagram of the subject novel system. In FIG. 1, a processor 1 is shown connected along line 2 to a nine bit binary clockwise counter 3 which in turn is connected along line 4 to a compare logic means 5. The compare logic means 5 is connected along line 6 to a nine bit binary counterclockwise counter 7 which is connected along line 8 to the processor 1.

The nine bit binary counter 3 also receives inputs along lines 20 and 21 from a step sequence checker 12 and along lines 40 and 43 from the processor 1. As shown in FIG. 1, line 40 is the reset line from the processor while lines 20 and 21 channel a pulse for each step the motor moves in the clockwise direction from the sequence checker 12. The clockwise pulses appearing on line 20 are also fed along line 22 into a direction and overshoot control means 11. The direction and overshoot control means 11 also receives counterclockwise pulses from the step sequence checker 12 along lines 23 and 25 and receives high and low indications along lines 37 and 36, respectively, from the compare logic means 5. The counterclockwise pulses from the step sequence checker 12 are also fed along line 24 to the nine bit binary counter 7. Likewise, line 40 upon which a reset signal is provided from the processor 1 is connected to line 42 so that the nine bit binary counter 7 may be reset.

The output from the compare logic means 5, in addition to being fed into the direction and overshoot control 11, is also fed along lines 31, 32, 33 and 34 to the deceleration prediction control means 10. As will be later described in more detail, the compare logic signals appearing on lines 31–34 provide error indications for use by the deceleration prediction control means 10. A signal appears on line 31 when the error is less than two steps (when the distance to the target is less than two steps); on line 34 when the error is less than eight steps; on line 33 when the error is less than 24 steps; on line 32 when the error is less than 40 steps. In addition, the deceleration prediction control means 10 receives inputs along lines 26–29 from the stepping rate checker 9 which receives 100 microsecond pulses along line 30 from the step sequence checker 12. The deceleration prediction control means 10 also receives an overshoot signal from the direction and overshoot control means 11 along line 47. The output from the deceleration prediction control means 10 appears on lines 44 and 45 which provide inputs to the priority and step to step control means 16. As shown in FIG. 1, line 44 provides the U1 input while line 45 provides the U6 input. The direction and overshoot control means 11 provides, along lines 50 and 51 respectively, the U2 and U3 inputs while the compare logic means 5 provides along line 35 the U5 input.

As further shown in FIG. 1, the stepping rate checker 9 is connected along lines 29 and 46 to a two term AND gate 14 which receives its other input along line 41 from the processor 1. The signal on line 41 from the processor 1 is, as will hereinafter become more apparent, the high speed command signal. The output of AND gate 14 is fed along line 52 which is the U4 input to the priority and step to step control means 16.

The step sequence checker receives inputs along lines 60–63 from the closed loop stepping motor 13 which indicates at which of four redundant positions the rotor is positioned. Additionally, a dark space signal is provided from the closed stepping motor along line 59 to the step sequence checker as the rotor moves from step to step. A more complete description of the closed loop stepping motor 13 which includes means for providing position feedback and means for generating dark space pulses is contained in a co-pending patent application Ser. No. 462,955 entitled "Closed Loop Stepping Motor Control System" filed June 10, 1965, assigned to the assignee of the subject application.

In the aforementioned patent application, a discriminator disc is used which is mounted on the shaft of the motor. For a 200 position stepping motor, 50 openings are provided around the disc each corresponding to a set of four sequential steps. Four light sources communicate through the openings in the disc with four associated photocells. The four light source-photocell combinations are spaced so that when the motor is at a given position only one photocell will have light falling on it. Further, as the rotor moves between positions, no photocell receives light, i.e., dark space between positions. As described in detail in the patent application, 50 four position increments are provided which result in the normal 200 position stepping motor sequencing. Additionally, the closed loop stepping motor system can be controlled to operate in the counterclockwise mode, the clockwise mode, the high speed mode and the stop mode.

As shown in FIG. 1, the priority and step to step control 16 provides control signals along lines 54–57 to cause the closed loop stepping motor system to selectively go into the clockwise, counterclockwise, high speed or stop modes, respectively. A signal from the priority and step to step control applied to line 58 merely causes the loop to be closed and if no signal appears on this line, the conventional open loop stepping mode can be entered into.

For purposes of operation description, assume that a move 100 steps in the clockwise direction is to be made. Because, as will later be described in detail, the contents of counters 3 and 7 are initially equal, the compare logic means 5 will bring up the equal line 35 thus providing a U5 type input to the priority step control means 16. Then, as will later be described in more detail in connection with FIG. 4, the priority and step control means 16 will convert this input to a stop command which is applied along line 57 to the closed loop stepping motor 13.

The processor therefore, upon initiating a new command, must first reset the nine bit binary counter 7 along lines 40 and 42 and reset the nine bit binary counter 3 along lines 41 and 43. After resetting the counters, the processor then loads in counter 7 the number 100 along line 8. After counter 7 is loaded, it provides an indication along line 6 of its contents to the compare logic means 5. The compare logic means 5 also receives an indication along line 4 from counter 3 of its contents and since they are unequal the compare logic means 5 will bring up line 37 to the direction and overshoot control means 11. The direction and overshoot control means 11 as will later be described in more detail in conjunction with FIG. 2 brings up line 50 which is the U2 input to the priority and step control means 16. The priority and step control means 16 then energizes the clockwise input line 54 to the closed loop stepping motor 13. Thus, the closed loop stepping motor 13 will begin to rotate its output shaft 64 in the clockwise direction. As the closed loop stepping motor 13 moves from step to step, as previously indicated, pulses indicative of the one of the four rotor positions are applied along lines 60–63 to the step sequence checker 12. Dark space pulses are fed along line 59 to the step sequence checker 12. The step sequence checker accepts these inputs from the closed loop stepping motor and, if the motor is moving in the clockwise direction, provides clockwise pulses along lines 20 and 21 to the binary counter 3. A pulse is fed along lines 20 and 21 to the binary counter 3 as the stepping motor arrives at each of its unique positions which in a 200 position stepping motor are 1.8° apart. Thus, the counter 3 is counted upwards such that when 100 steps have been made by the closed loop stepping motor 13, the contents of the counter 3 will equal the contents of the counter 7 and the compare logic 5 will at that time provide an equal output along line 35 to the priority and step to step control means 16 which will then energize the stop input to the closed loop stepping system 13.

The previous operational description was that of an operation wherein the motor moved from its initial position to a new position 100 steps away in the clockwise direction at a low speed. One of the objects of the system is, however, to provide a means wherein high rates of acceleration and deceleration from an initial position to a target position can be obtained with a minimum amount of processor intervention. Consider again the case wherein the processor loads 100 counts into the nine bit counter 7 and the priority and step to step control means 16 energizes the clockwise input to the closed loop stepping motor 13. Assume that the processor then brings up the high speed line 41 which is connected to AND gate 14. The pulses from the step sequence checker 12 are, as previously described during the low speed operation, passed along lines 20 and 21 to the nine bit binary counter 3 to count it up toward 100. Additionally, however, the step sequence checker 12 for each of the pulses that are fed along lines 20 and 21 into the counter 3 provides a 100 microsecond pulse along line 30 to the stepping rate checker 9. The stepping rate checker 9 monitors the frequency of the pulses appearing on line 30 and provides outputs along lines 26–29 in accordance with the velocity of the motor. Thus, when the stepping motor is moving at its maximum velocity, all of the lines 26–29 will be energized while at zero speed, none of the lines will be energized. The operation of the stepping rate checker 9 will later be described in detail in connection with FIG. 5.

The outputs from the stepping rate checker 9 are fed to the deceleration prediction control means 10 wherein they are acted upon in conjunction with the error signals generated by the compare logic means 5 applied along lines 31–34. Output commands from the deceleration and prediction control means are applied along lines 44 and 45 to the priority control and step to step controller 16 to cause the motor to follow a previously established ideal deceleration trajectory. The following of this previously established deceleration trajectory is without computer intervention. A detailed description of the deceleration predicion control means 10 and priority control and step to step controller will be given in connection with FIGS. 3 and 4, respectively.

The output from the deceleration prediction control means 10 is applied along lines 44 and 45 and makes up the U6 or stop command and the U1 or step to step input command to the priority and step to step control means 16, respectively.

During the foregoing description, it has been assumed that the motor, upon the energization of line 41, would move into the high speed mode. However, this is not completely accurate. In FIG. 1, it will be seen that the output line 29 from the stepping rate checker is not only connected to the deceleration and prediction control means 10 but is also connected along line 46 to AND gate 14 and thus constitutes the other input to the AND gate. When both lines 41 and 46 are up, AND gate 14 will provide a signal along line 52 to the U4 input to the priority and step to step control means. U4 is the high speed input line. Therefore, it is not enough that line 41 is up but additionally the motor must be moving at a speed greater than $S > S_{min}$. The significance of this will be better appreciated after a reading of the aforementioned patent application. Briefly, as therein described, in the high speed mode of operation, instead of energizing windings such that the rotor will move to the next adjacent step, windings two steps away from current rotor position are energized. If this is done at stop, equal torque is applied in both directions and the motor is unstable. A slight disturbance in either direction would cause the rotor to move in that direction. The motor must therefore be brought up to a minimum speed ($S_{min}$) in the one step energization mode prior to being shifted into the high speed mode of operation. $S_{min}$ will depend on the motor: however, in most commercially available stepping motors, $S_{min}$ is approximately 200 steps per second.

While in the operational description, only the operation of the system wherein movement in the clockwise direction is to be effected has been described, the movement in the opposite direction is obtained in the same manner except that the other counter will be loaded initially. Thus, to move in a counterclockwise direction, the appropriate count would be loaded by the processor in the counter 3 and the compare logic means 5 would then provide a low indication along line 36 to the direction and overshoot control means 11 which would provide an indication along line 51 to the priority and step to step control means thereby causing it to provide a counterclockwise output along line 55 to the closed loop stepping motor 13. Again from the step sequence checker 12, a series of counterclockwise pulses would be passed along lines 23 and 24 to cause the nine bit binary counter 7 to step up to achieve a compare.

In the previous descriptions, no mention was made of the function of the overshoot portion of the direction and overshoot control means 11. Assume that the deceleration and prediction control means 10 had not been able, because of frictional variations or load variations, to precisely stop the servo mechanism on the target. If the system were moving in the clockwise direction and an overshoot occurs, the clockwise counter 3 would contain counts in excess of that originally loaded in the counterclockwise counter 7. The compare logic means 5 then brings up the low line 36 to the direction and overshoot control means 11 and drops the high line 37 which was up during the time that the servo mechanism was moving toward the desired target. During an overshoot, the direction and overshoot control means 11 will continue to receive a clockwise pulse along lines 20 and 22 for each step overshoot. These overshoot pulses in conjunction with the low signal applied along line 36 will cause the direction and overshoot means 11 to hold line 47 up to cause a stop signal to be applied by the deceleration prediction control means 10 along line 45 to the priority and step to step control means 16. When the motor slows down below $S_{min}$, the deceleration and prediction control means 10 will cause the motor to go into a step to step mode of operation and will reverse it to cause it to correct the error. Thus, the motor will drive in a direction such that the error will be corrected and the counter containing the least number of pulses will be incremented step by step until the motor arrives at its target position at which time the equal output line 35 from the compare logic means 5 will be energized causing the stepping motor 13 to receive a stop command along line 57 from the priority and step to step control means 16.

Figure 2:
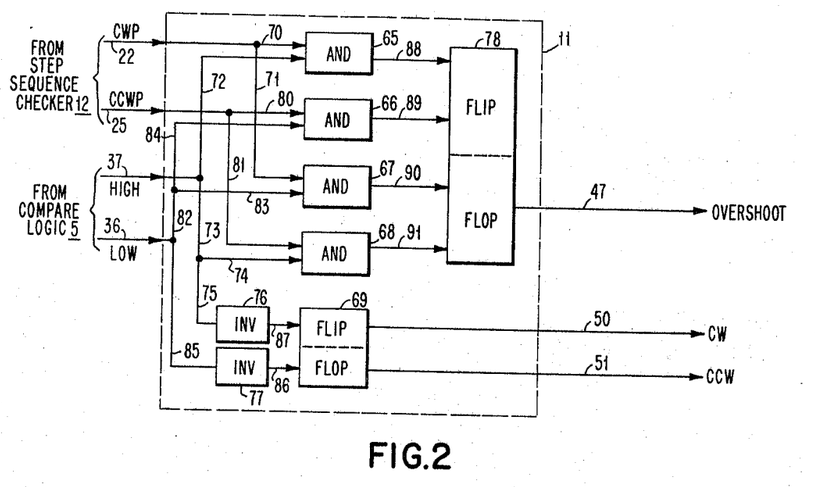
FIG. 2 is a detailed diagram of the direction and overshoot control means of FIG. 1.

For a more detailed description of the direction and overshoot control means 11 of FIG. 1, refer to FIG. 2. In FIG. 2 as indicated, lines 22 and 25 are connected to the step sequence checker while the high and low lines 37 and 36, respectively, are connected to the compare logic means 5. Again, as shown in FIG. 2, the overshoot indication is provided along line 47 while the direction control clockwise signal is provided along line 50 and the counterclockwise direction control signal is provided along line 51. Only line 50 or 51 will be up. Both lines cannot be up at the same time.

In FIG. 2, line 22 from the step sequence checker provides pulses along lines 70 and 71 into AND gates 65 and 67, respectively. Pulses from the step sequence checker are also provided along line 25 when the motor is moving in the counterclockwise direction and these pulses are fed along lines 80 and 81 to AND gates 66 and 68, respectively. Lines 37 and 36 receive inputs or proper logical gating levels from the compare logic means 5. As previously briefly described, only one of the lines, i.e., either the high or low line, can be up at one time. The logical level indicative of a high output from the compare logic means is applied along lines 37 and 72 to AND gate 65 to make up the other term thereof and is applied along lines 37, 73 and 74 into AND gate 68 to make up the other input term to it. Additionally, the high level is applied along lines 37, 73 and 75 to the inverter 76. This logical level into inverter 76 is inverted and applied along line 87 at the proper level to the set side of flip flop 69 to cause output line 50 which is the clockwise line to rise in the event that the high input level line 37 from the logic compare means is up. When line 36 is at the proper logical gating level indicating that a counterclockwise move is to be made, a logical level is applied along lines 82 and 84 into AND gate 66 and is further applied along lines 82 and 83 into AND gate 67. Additionally, this logical level is applied along line 85 to inverter 77 which inverts the logical level and applies it along line 86 to the flip flop 69. As will be obvious to one skilled in the art, the inverters 77 and 76 are used merely to convert the logical levels into those which may be used by the flip flop 69 for set and reset. Again the level applied along line 86 is used to set the flip flop 69 in the event that a counterclockwise move is to be made. This will cause line 51 to come up.

From the foregoing, it will be seen that the system of FIG. 2 provides direction control signals along lines 50 and 51 which as shown in FIG. 1 are applied to the priority and step to step control means which converts them to provide usable control signals to the closed loop stepping motor. Additionally, the system of FIG. 2 provides a consistency check between the pulses from the step sequence checker which are indicative of the actual direction of the movement of the motor with the signals from the compare logic means which are indicative of the desired direction of movement. Thus, considering the case when the high line 37 from the compare logic means is up, it will be seen that one input to AND gate 65 and one input to AND gate 68 will be high. If as is proper, the pulses from the step sequence checker are applied to line 22, AND gate 65 will provide a set level along line 88 to flip flop 78. Likewise, if the low line is up and pulses are received on line 25, AND gate 66 will provide a set level to flip flop 88. If, however, while line 37 is high, pulses from the step sequence checker are applied along line 25, gate 68 will provide a reset level along line 91 to flip flop 78 and cause overshoot line 47 to come up. In the same way, if both the low line 36 from the compare logic means and clockwise line 22 from the step sequence checker are up, AND gate 67 will provide a reset level to line 90 to thereby cause flip flop 78 to bring up the overshoot line 47.

Figure 3:
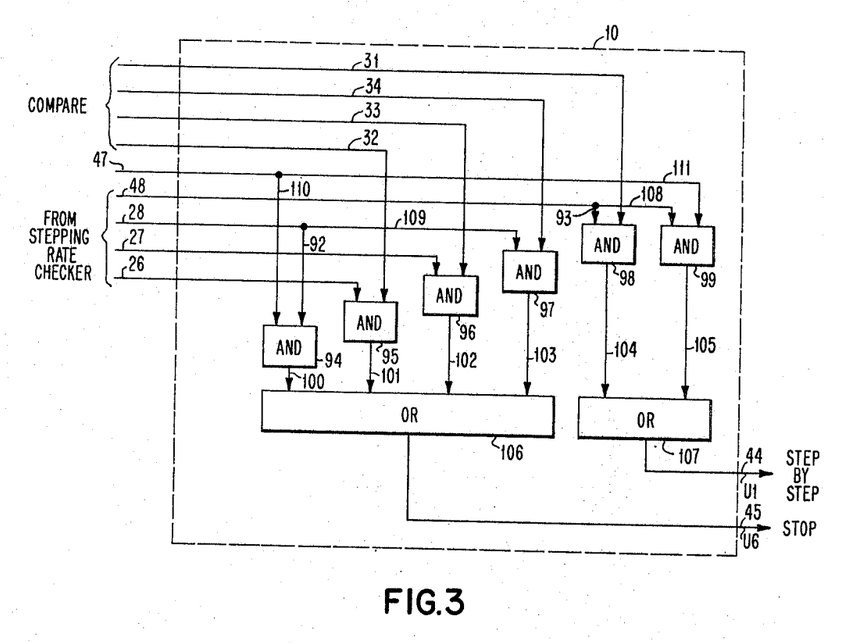
FIG. 3 is a detailed diagram of the deceleration prediction control means of FIG. 1.

Refer next to FIG. 3 which shows in detail the means for providing deceleration prediction and control. In FIG. 3 is shown a series of AND gates 94–97 which provide inputs along lines 100–103, respectively, to OR circuit 106. Additionally, AND gates 98 and 99 provide inputs along lines 104 and 105, respectively, to OR circuit 107. The inputs to AND gate 94 are along lines 47 and 110 from the overshoot flip flop contained in the direction overshoot control means and along lines 46 and 92 from the stepping rate checker when S is greater than $S_{min}$. In this and later descriptions, S is a notation used to indicate instant stepping rate while $S_{min}$ refers to a specific predetermined rate in steps per seconds. As shown in FIG. 3, the inputs to AND gate 95 are along line 26 from the stepping rate checker and along line 32 from the compare logic means. The inputs to AND gate 96 are along line 27 from the stepping rate checker and along line 33 from the compare logic means. Finally, the inputs to AND gate 97 are from the stepping rate checker along lines 46 and 109 and from the compare logic means along line 34.

The inputs to AND gate 98 are from the stepping rate checker along lines 48 and 93 and from the compare logic means along line 31. The inputs to AND gate 99 are from the stepping rate checker along lines 48 and 108 and from the overshoot flip flop along lines 47 and 111.

Figure 6:
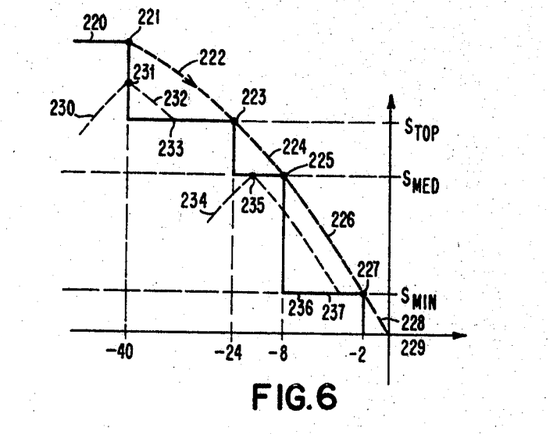
FIG. 6 is a chart illustrative of the operation of the system in following the time operable deceleration trajectory as well as being illustrative of the method of approaching the time optimal deceleration trajectory at a speed less than the system operating speed.

To facilitate an operational description of the deceleration prediction and control means, refer to FIG. 6 which is a velocity trajectory curve. Consideration of the plot of FIG. 6 will enable a better understanding of the system of FIG. 3 which has been implemented to achieve the velocity position trace shown in FIG. 6. The portion of the curve 220 indicates the maximum speed that a given system can achieve. The curve from point 221 along 222, 223, 224, 225, 226, 227 and 228 down to 229 indicates the steepest deceleration curve that the system can follow. The object of the deceleration prediction scheme is to determine at which point it is necessary to apply deceleration control to the motor. In FIG. 6, the curve previously mentioned is approximated by a staircase consisting of vertical lines corresponding to 40, 24, 8 and 2 steps error and velocity levels corresponding to $S_{min}$, $S_{med}$, and $S_{top}$. If the system is approaching 40 steps error at maximum speed as along curve 220, when switched into deceleration at point 221, it will follow the curve 222, 223, etc. down to the zero objective at point 229. If, however, the system is approaching 40 steps error along curve 230, it will be switched into deceleration at point 231 and follow curve 232 until the top horizontal speed level is hit at 233 at which point the system will follow a more or less constant speed until point 223. Now, as the ideal curve is approached, the system will continue to decelerate as previously mentioned down to point 229. Similarly, if the deceleration curve is approached along curve 234, no deceleration will be initiated until point 235 is reached. The motor then travels at a constant rate of speed such that the trajectory follows the horizontal line to point 225 at which time again the original deceleration curve is followed down to 229. The objective of the staircase approach is to limit the hardware and yet obtain a deceleration closure to time optimal. Thus, it can be seen that by having secondary correction along the horizontal staircase, the original or ideal deceleration curve is quickly reached. If only one prediction point were used, for instance, at 40 steps error, the total correction would have to be performed at a low velocity level and therefore would require a longer time for correction.

In essence then, the technique of FIG. 6 provides a method of causing the system to follow the optimum curve 221–229 even though the system may approach the curve from below, as indicated by plots 230 and 234 or may come into the curve from the maximum speed line 220. One of the important features, as will be apparent to those skilled in the art, associated with this technique is that the corrections for velocity are made at relatively high speeds. As above indicated, this is quite important and results in a time gain as distinguished from the situation where corrections are made at low speeds and therefore require greater amounts of time.

FIG. 3 shows an operational implementation of the technique illustrated in FIG. 6. In the subject system, the stop command takes a priority. In implementing the technique of FIG. 6, when the stop command is initiated, the system will enter into the stop mode of operation and return to the high speed mode of operation when the stop mode is lifted. Assume for purposes of illustration that the motor is approaching the target and the error is greater than 40. In this situation, none of the AND gates 94–99 will be energized and, consequently, neither of the output lines 44 or 45 will be up. If the motor is traveling at $S_{max}$ when point 221 is reached, AND gate 95 brings up line 101 since line 26 from the checking rate checker is up and since the speed is greater than $S_{top}$. Thus, the OR circuit 106 provides a stop signal along line 45. This signal causes the motor to track curve 222 down to point 223. At point 223, AND gate 95 will no longer enable OR circuit 106 since the speed is less than $S_{top}$ and therefore line 26 will fall; however, AND gate 96 will now enable OR circuit 102 to provide a stop command along line 45 since line 33 from the compare logic means is up and line 27 from the stepping rate checker is up since the speed is higher than $S_{med}$. Thus, the motor will track along line 224 to point 225 at which time AND gate 96 ceases to enable OR circuit 106 but AND gate 97 then enables OR circuit 106 to bring up the stop line 45 since at this point the speed is greater than $S_{min}$ which causes line 109 to be up and the error is less than 8 which causes line 34 from the compare logic means to be up. Again, from point 225, the motor decelerates along curve 226 to point 227. When point 227 is reached, AND gate 97 ceases to enable OR circuit 106 since the speed is below $S_{min}$. At this point, the error is less than 2 and therefore line 31 is brought up by the compare logic means which is applied to AND gate 98 and line 48 from the stepping rate checker is brought up and applies a logical level along line 93 to AND gate 98 which brings up OR circuit 107 along line 104.

OR circuit 107 brings up line 44 which is the step by step line. The motor then goes into a step by step operation. Thus, in the usual case, where no overshoot occurs, the pulses from the stepping rate checker will cause the motor to step the final two steps in the step by step mode assuring near time optimal operation without oscillation around the target point. As illustrated in FIG. 3 in the event that an overshoot occurs and line 47 is brought up, since the speed is less than $S_{min}$, line 48 comes up which causes AND gate 99 to cause the motor to go into the step by step mode. This, again as previously described, will cause the motor to come around step by step to the target location in the event of overshoot.

The previous description has been of the operation of the system of FIG. 3 when the target point was approached in an ideal manner, i.e., when the motor was traveling at top speed when an error of 40 steps was detected. Assume, however, that the motor approaches along curve 230, i.e., that the motor because of the closeness of the target position or because of the load has not had a chance to reach top speed. In this case, as previously mentioned, the motor will be in the high speed mode of operation. When point 231 is reached, which occurs when the error is less than 40, AND gate 95 is enabled by line 32 coming up and by line 26 being up which occurred when the velocity of the motor passed above $S_{top}$. AND gate 95 will, acting through OR circuit 106, cause stop line 45 to be energized. For the motor to follow the ideal trajectory, stop line 45 must stay up as shown in FIG. 6 until point 233 is reached and then must track horizontally until point 223 is reached. This is achieved in the following manner. Stop is applied and the motor traces the trajectory 232 and arrives at point 233. When point 233 is reached, AND gate 95 no longer enables OR circuit 106 since the velocity of the motor is no longer greater than $S_{top}$. When this occurs, the high speed mode of operation is attempted to be entered into and the motor will, for one step, accelerate above or up to the speed equal to $S_{top}$. When this occurs, AND gate 95 will again cause the motor to come back down and follow the horizontal trace by applying stop. This oscillatory tracking will then take place until point 223 is reached and, as previously described, the system will then follow curves 223–229. The same type of controlled tracking is effected when the motor approaches along curve 234.

In the previous brief description of the overshoot sequence wherein the motor goes into the step by step mode of operation to turn around and step back to the target point, no mention was made of what occurs with the worst condition wherein the motor overshoots to a very great degree and when, during overshoot, the motor is traveling at a speed higher than $S_{min}$. When this occurs as shown in FIG. 3, AND gate 94 will enable stop line 45 through OR circuit 106. Consideration of the system of FIG. 3 will show that during overshoot, line 47 is up which causes one term of AND gate 94 to be enabled along line 110 while the other term of AND gate 94 is enabled by stepping rate checker along lines 28 and 92. Thus, AND gate 94 will cause stop to be applied until, as previously mentioned, the speed of the motor falls below $S_{min}$. This assures time optimal control not only in the situation where the motor is driven accurately down to the target point but, additionally, assures time optimal control during correction in the event of overshoot.

Figure 4:
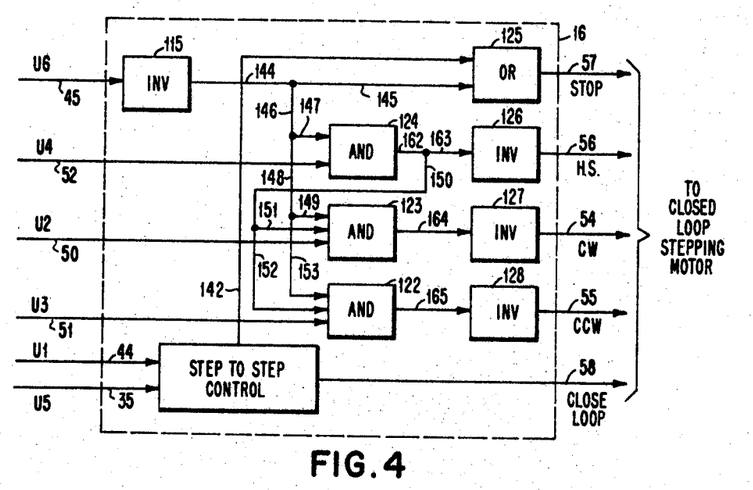
FIG. 4 is a detailed diagram of the priority and step-to-step control means of FIG. 1.

Refer next to FIG. 4 which is a detailed diagram of the priority and step to step control means generally depicted at 16 in FIG. 1. The function of the priority step to step control means is to assure that the priorities established for the system operation are achieved. As previously indicated, the stop input command takes precedence over all other input commands so that various operation schemes like the deceleration prediction control scheme can be implemented. In second order of priority is the high speed command which takes precedence over the direction commands, i.e., clockwise and counterclockwise.

The output lines from the priority and step to step control means 16 are as previously described applied to the stepping motor along lines 54–58. As described in the previously mentioned patent application entitled "Closed Loop Stepping Motor Control System," the inputs to the motor must be unique. As further described therein, the motor is initially started in the direction that is to be moved by initial application of a direction command of either clockwise or counterclockwise and then after a predetermined speed has been achieved, is switched into the high speed mode of operation.

In FIG. 4, there is shown an inverter 115 which receives an input signal (stop) along line 45 from the deceleration and prediction control means. The output of the inverter 115 is applied along lines 144 and 145 to an OR circuit 125 which is connected to the stop output line 57. Line 52 (high speed) from the processor is connected to AND gate 124 which, in turn, receives an input along lines 144, 146, and 147 from inverter 115. The output of AND gate 124 is applied along lines 162 and 163 to inverter 126 which has its output taken along line 56. The output from AND gate 124 is also taken along lines 150 and 151 and applied as an input term to AND gate 123 and taken along lines 150 and 152 and applied as an input term to AND gate 122. AND gate 123 also receives an input from the inverter 115 along lines 144, 146, 148 and 149 and receives its third input term (clockwise) along line 50 from the direction and overshoot control means. The output of AND gate 123 is applied along line 164 to inverter 127, the output of which is applied along line 54. AND gate 122 receives an input from the inverter 115 and, additionally, receives an input from the direction and overshoot control means along line 51 (counterclockwise). The output of AND gate 122 is applied along line 165 to inverter 128 which has its output taken along line 55.

The logic levels applied to lines 35, 44, 45 and 50–52 are positive when the lines are considered activated. AND gates 122–124 are activated by plus logic levels applied to their input and provide negative logic levels on their outputs. The inverter 115, as is obvious, inverts the positive logic level applied along line 45 to a negative logic level. The OR circuit 125 accepts a negative logic level at its input and inverts these negative logic levels to a positive logic level on output line 57.

In operation, assume that line 45 is up which as previously mentioned constitutes a stop command. This positive logic level is in inverter 115 and is applied to the OR circuit 125 and appears as a stop output command on line 57. This negative signal is likewise applied to AND gates 122–124 and thus prevents their input terms from being met. Thus, lines 163–165 into inverters 126–128, respectively, will be at a positive logic level which will be inverted in the inverters and appear as negative logic level on lines 56, 54 and 55, respectively.

Assume that a high speed command is received. In this event, line 52 will have a positive logic level applied to it which is applied to AND gate 124. If line 45 is at a negative level which will be the case if no stop command is being applied, inverter 15 will invert this negative logic level to a positive logic level and apply it at AND gate 124 which will then have both its input terms met and will cause a negative logic level to be applied to inverter 126, which in turn provides a positive logic level to output line 56. At the same time, as previously indicated, one of the direction lines 50 or 51 must be up and again as previously mentioned, the high speed command must take priority over them. In this situation assume that the counterclockwise line 51 is up. AND gate 122 will then receive a positive logic level along line 51 and will receive a positive logic level, assuming that no stop command is being received, from the inverter 115. Its two input terms will meet. However, AND gate 124 also provides a negative logic level along lines 150 and 152 to AND gate 122 and thus its input terms cannot be met and its output will be at a positive logic level which, when inverted in inverter 128 will appear as a negative logic level along line 55. The same is true in the event that the clockwise line 50 is energized. AND gate 124 will, in that case, inhibit AND gate 123.

The remaining block in FIG. 4 is the step-to-step control. It functions to provide time optimal control for the last two steps of any motion. When the step to step control is used, it utilizes a special single coil operation of the regular two phase stepping motor. This method of operation is described in detail in a U.S. patent application Serial No. 606,174 entitled "Hybrid Closed Loop Stepping Motor System" by T. R. Fredriksen, filed on the same day as the present application and assigned to the same assignee thereof.

Figure 5:
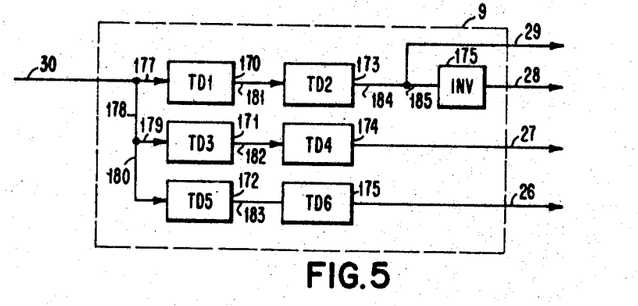
FIG. 5 is a detailed diagram of the stepping rate checker of FIG. 1.

In FIG. 5 is shown a schematic of the stepping rate checker 9 of FIG. 1. The 100 microsecond pulses are applied along lines 30 and 177 to a time delay TD1. These pulses are likewise applied along lines 178 and 179 to TD3 and along lines 178 and 180 to TD5. The output of TD1 is applied along line 181 to another TD2, the output of which is applied along lines 184 and 185 through an inverter 176 to output line 28. Likewise, the output from TD2 is applied along line 184 to line 29. In like manner, the output of TD3 is applied along line 182 to TD4, the output of which is applied to line 27. Finally, the output of TD5 is applied along line 183 to TD6, the output of which is applied to line 26.

As shown in time delays TD1, TD3, TD5, the period of delay is equal to $\Delta T1$, $\Delta T2$, and $\Delta T3$, respectively. In a conventional 200 position stepping motor, $\Delta T1$ would be equal to 5 milliseconds; $\Delta T2$ equal to one millisecond; and $\Delta T3$ equal to .5 millisecond. Likewise, as indicated the time period of TD2 is equal to $\Delta T1+200$ microseconds; TD4 is equal to $\Delta T2+200$ microseconds; and TD6 is equal to $\Delta T3+200$ microseconds.

In operation, the series of positive 100 microsecond pulses are applied along lines 30 and 177 to TD1. The output of TD1 appearing on line 181 is positive until the leading edge of the first 100 microsecond pulse is applied to it. When this occurs, the output on line 181 goes negative. At the trailing edge of the 100 microsecond pulse, TD1 starts timing out and will maintain its output line at a negative logic level for a period of time equal to $\Delta T1$. At the end of this time, its output on line 181 will again go positive. It will be seen that as the 100 microsecond pulses get closer and closer together, a time is reached that, due to their closeness, the output on line 181 will not go positive and TD2 will not be reset. Therefore, 100 microseconds after the last positive pulses from TD1, TD2 will time out and the output appearing on its output line 184 will at that time go positive. Time delays TD3 and TD5 operate in the same manner with their respective time delays, $\Delta T2$ and $\Delta T3$, respectively.

Figure 7:
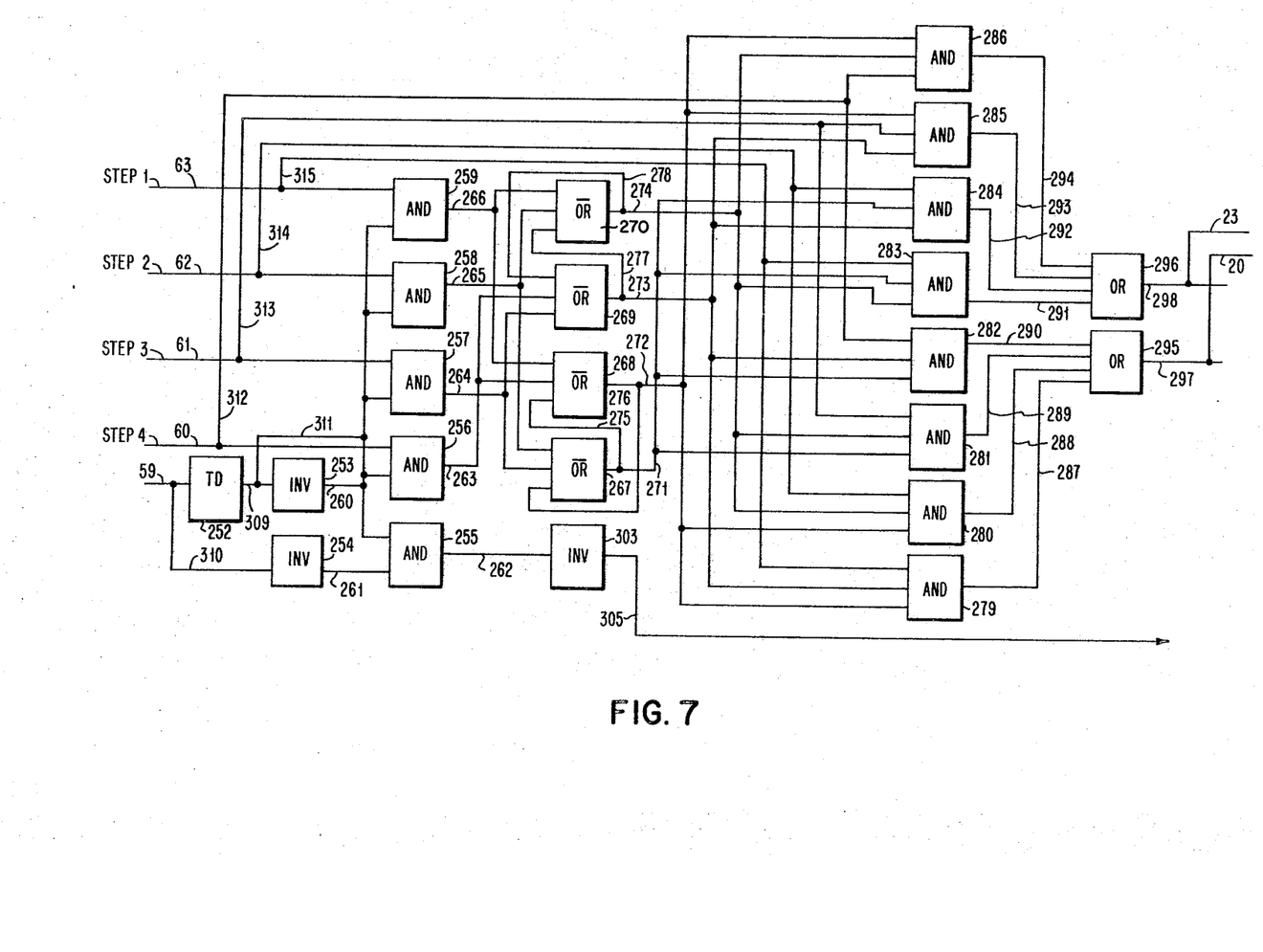
FIG. 7 is a diagram of the step sequence verifier.

In FIG. 7 is shown a schematic of the step sequence checker 12 of FIG. 1. Lines 60–63 are brought up to a positive logic level as the motor goes through steps 1–4 as indicated. When the motor is between steps as previously described, line 59 which is the dark space line is up. The signal on line 59 is applied to the 100 microsecond time delay circuit 252. The time delay circuit 252 operates as follows. If the input changes from a positive logic level to a negative logic level, the output on line 309 will change from a negative logic level to a positive logic level 100 microseconds later. If, however, the input on line 59 rises from a negative logic level to a positive logic level, the output on line 309 immediately changes from a positive logic level to a negative logic level. The output from the time delay line 252 is applied along line 311 and makes up one term of AND gates 256–259. The other term of AND gates 256–259 is made up by signals from the step discriminator applied along lines 60–63, respectively. The output from AND gate 256 is connected along line 263 to OR circuits 268 and 269; output line 264 from AND gate 257 is connected to OR circuits 267 and 269; output line 265 from AND gate 258 is connected to OR circuits 267 and 270; output line 266 from AND gate 259 is connected to OR circuits 268 and 270.

OR circuits 267–270 are negative ORs; i.e., any negative input will produce a positive output while all inputs must be positive to yield a negative output. The output of OR circuit 267 is fed back along line 275 and makes up an input to OR circuit 268 while the output of OR circuit 268 is fed along line 276 and makes up an input to OR circuit 267. The output of OR circuit 269 is fed along line 277 and makes up an input to OR circuit 270 while the output of OR circuit 270 is fed along line 278 and makes up an input to OR circuit 269. Thus, OR circuits 267–270 by means of their feedback connections constitute holding circuits to hold the step signal which appears on lines 60–63 as a specific binary combination of OR gates 267–270. For example, a type 1 step input which applies a positive logic level to line 63 will set the output of OR circuits 270 and 268 to positive logic levels and by virtue of the feedback connections will force a negative logic level on the output line 273 of OR circuit 269 and output line 271 of OR circuit 267. A type 2 step sets the output levels of OR circuits 270 and 267 to positive logic levels; a type 3 step sets the output lines of OR circuits 267 and 269 to positive logic levels; and a type 4 step sets the output lines of OR circuits 268 and 269 to positive logic levels.

As the rotor rotates to a new step, the new step information will appear on lines 60–63. As above indicated, only one of these lines will be up at any one time. The new step information will appear simultaneously with the changing of the dark space signal on line 59 from a positive logic level to a negative logic level. During the dark space signal, AND gates 256–259 will be blocked since the time delay output provides a negative logical level on line 311. As the dark space signal falls, the new step information appears on lines 60–63 but the output of the time delay 252 does not change until 100 microseconds later. Therefore, for 100 microseconds at the beginning of each new step detected, the hold circuits 267–270 will still contain the old step information since they cannot be updated until AND gate 256–259 have their conditions satisfied. However, during this 100 microsecond period, the new step information is present on lines 60–63. As shown, the step 1 information is applied along line 315 to the inputs of AND gates 283 and 279; the step information appearing on line 62 is applied along line 314 to the input of AND gates 284 and 280; the step information on line 61 is applied along line 313 to the input of AND gates 285 and 281; and the step 4 information appearing on line 60 is applied along line 312 to AND gates 286 and 282.

The other input terms to AND gates 279–286 are from the OR hold circuits 267–270. As shown, output line 271 from OR circuit 267 makes up an input term to AND gates 281, 282, 283 and 284; output line 272 from OR circuit 268 makes up an input term to AND gates 279, 280, 285 and 286, output line 273 from OR circuit 269 makes up an input term to AND gates 279, 282, 284 and 285 while output line 274 from OR circuit 270 makes up an input term to AND gates 280, 281, 283 and 286. The logical configuration of AND gates 279–286 is such that if a clockwise or counterclockwise step is commanded and the rotor actually moves in the desired direction, one of the AND gates will have a positive logic level output. For example, assume that movement from a step 4 to a step 3 is in the counterclockwise direction. In this case, line 61 would be up since the rotor is at the new step; i.e., step 3. A positive logic level is therefore applied along line 313 to AND gate 285 to thus satisfy the first of its three input terms. At the same time, OR circuits 267–270 hold the old step information indicating that the old step was a type 4 step. Thus, OR circuits 268 and 269 will have a positive logic level on their output lines 272 and 273, respectively. A positive logical level on line 272 will cause the second input term of AND gate 285 to be satisfied while the positive logic level on line 273 will cause the third and final input term to AND gate 285 to be satisfied. In a similar manner, one of the AND gates will be at a positive logic level for each of the valid steps either in the counterclockwise or clockwise direction. Thus, AND gate 279 will have a positive logic level on its output line during clockwise movement from a type 4 step to a type 1 step; AND gate 282 will have a positive logic level on its output line 290 for a clockwise movement from a type 3 to a type 4 step; AND gate 281 will have a positive logic level on its output line 289 for a movement in the clockwise direction from a type 2 to a type 3 step; while AND gate 280 will have a positive logic level on its output line 288 for a clockwise movement from a type 1 to a type 2 step. AND gate 284 will have a positive logic level on its output line 292 for a counterclockwise movement from a type 3 to a type 2 step; AND gate 285 will have a positive logic level on its output line 293 for a counterclockwise movement from a type 4 to a type 3 step; AND gate 286 will have a positive logic level on its output line 294 for a counterclockwise movement from a type 1 to a type 4 step; and AND gate 283 will have a positive logic level on its output line 291 for a counterclockwise movement from a type 2 to a type 1 step.

The output lines from the counterclockwise AND gates 283–286 are connected to OR circuit 296 which provides a positive logical level on its output line 298 for a valid counterclockwise movement. This output is applied to line 23 as shown. Clockwise AND gates 279–282 provide their output to OR circuit 295 which will have a positive logical level on its output line 297 and line 20 connected thereto for a valid clockwise step. Finally, line 30 which is connected to the output of AND gate 255 through inverter 303 provides a series of 100 microsecond pulses which are fed to the stepping rate checker previously described.

In the previous description and in the claims, it is assumed that when the system reaches the time optimal curve that, upon application of stop to the motor, the time optimal curve will be followed. As will be apparent to one skilled in the art, this is not entirely true. The deceleration curve depicted and referred to in the description and claims as the time optimal deceleration curve is "worst case curve." By this is meant that this is the curve the system would follow upon application of full stop with the greatest allowable system load. Obviously, a steeper deceleration takes place with lesser loads. This steeper deceleration does not, however, cause the system to undershoot the target position. Instead, at each corrective speed level, the system again tracks along the speed level until it again intersects the time optimal deceleration trajectory and again enters into full stop until the next corrective speed level is reached, etc. It will be appreciated therefore that optimum deceleration is obtained at full load and near optimum deceleration is obtained at lesser loads since correction for undershoot is accomplished at relatively high speeds rather than correcting at a lower terminal speed or step-to-step operation.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for generating control signals for application to a motor driving a load to a target position, said system comprising:
    means for generating signals proportional to the velocity of the motor;
    means for generating signals proportional to the distance of the load from the target position; and
    logic means receptive of said velocity signals and said error signals operative when the motor is driving at less than its top speed when said load approaches a predetermined distance from the target position for generating alternate acceleration and deceleration control signals, said signals causing the load to intersect the time optimal deceleration trajectory along a predetermined corrective speed level, which predetermined speed is dependent on the distance to the target and the speed of the motor.

2. In the system of claim 1, said logic means further including means for providing a plurality of corrective speed levels and for causing the motor to track the highest corrective speed level possible without overshoot upon intersecting said time optimal deceleration trajectory.

3. In the system of claim 1, when the motor is driving at its top speed the logic means further including means for applying stop at a predetermined distance from said target position, which predetermined distance is the distance required to bring the largest system load to rest precisely at the said target point.

4. In the system of claim 3, the logic means further including means for providing a plurality of corrective speed levels and for causing the motor to track the highest corrective speed level possible without overshoot upon intersecting said time optimal deceleration trajectory.

5. The system of claim 9 wherein said second generating means for generating a distance signal proportional to the distance of the load from the target position comprises a target register into which is loaded a number proportional to the distance said load is to move, a position feedback transducer connected to said load and a compare means connected to both said target register and said position feedback transducer for generating signals when said load is at a number of preselected distances from the said target position.

6. The system of claim 9 wherein the first generating means for generating a velocity signal proportional to the velocity of the motor includes means for providing a signal indicative of whether the motor is traveling above or below any of said corrective speed levels.

7. The system of claim 6 including means for operating said motor in a high speed mode when the motor is traveling below the said highest possible corrective speed level and means for operating said motor in a stop mode when the motor is traveling at a speed greater than the said highest possible corrective speed level.

8. The system of claim 5 wherein the target register is a digital register and positional feedback transducer is a digital transducer.

9. A servo control system for generating control signals for application to a motor driving a load to a target position, said system comprising:
    first generating means for generating a velocity signal proportional to the velocity of the motor;
    second generating means for generating a distance signal proportional to the distance of the load from the target position;
    logic means receptive of said velocity and distance signals for generating said control signals, said logic means comprising:
        means for defining a plurality of possible corrective speed levels, each said level corresponding to a region of distances of the load from the target, means operative when the motor is driving the load at its top speed upon said load reaching a predetermined distance from said target position for generating deceleration control signals,
 said deceleration signals causing said load to reach said target along the time optimal deceleration trajectory, means operative when the motor is driving the load at less than its top speed upon said load reaching said predetermined distance for generating alternating acceleration and deceleration control signals,
 said alternating signals causing said load to reach said trajectory along the highest possible corrective speed level, and thereafter said deceleration signals causing said load to reach said target along said trajectory.

References Cited

UNITED STATES PATENTS

| | | | |
|---|---|---|---|
| 2,907,937 | 10/1959 | Apgar et al. | 318—28 |
| 2,994,025 | 7/1961 | Mitchell | 318—204 |
| 3,122,687 | 2/1964 | Romuari | 318—28 |
| 3,139,570 | 6/1964 | Jacobson et al. | 318—28 |
| 3,245,073 | 4/1966 | Strunk et al. | 340—347 |
| 3,350,612 | 10/1967 | Hansen et al. | 318—448 XR |

BENJAMIN DOBECK, Primary Examiner

U.S. Cl. X.R.

318—28, 30